United States Patent [19]

Young et al.

[11] Patent Number: 5,017,846
[45] Date of Patent: May 21, 1991

[54] STALL PROTECTION CIRCUIT FOR AN ELECTRONICALLY COMMUTATED MOTOR

[75] Inventors: Glen C. Young; James R. Kiefer, both of Fort Wayne, Ind.

[73] Assignee: General Electric Company, Fort Wayne, Ind.

[21] Appl. No.: 505,163

[22] Filed: Apr. 5, 1990

[51] Int. Cl.$^5$ ............................................. H02H 7/08
[52] U.S. Cl. ................................. 318/244; 318/434; 361/23
[58] Field of Search ............... 318/244, 432, 433, 434; 361/23, 24, 29, 30, 31; 388/903, 909, 934, 804–806, 811–815

[56] References Cited

U.S. PATENT DOCUMENTS

| | | | |
|---|---|---|---|
| 3,824,440 | 7/1974 | McIntosh | 318/434 X |
| 4,290,000 | 9/1981 | Sun | 318/434 X |
| 4,370,690 | 1/1983 | Baker | 361/23 |
| 4,500,821 | 2/1985 | Bitting et al. | 318/254 |
| 4,509,088 | 4/1985 | Profio | 361/31 X |
| 4,553,187 | 11/1985 | Burns et al. | 361/31 X |
| 4,568,996 | 2/1986 | McElhenny | 361/31 |
| 4,659,976 | 4/1987 | Johanson | 318/434 X |
| 4,725,765 | 2/1988 | Miller | 318/434 |
| 4,763,347 | 8/1988 | Erdman | 318/254 |

Primary Examiner—William M. Shoop, Jr.
Assistant Examiner—A. Jonathan Wysocki
Attorney, Agent, or Firm—Ralph E. Krisher, Jr.

[57] ABSTRACT

A control circuit for a system including an electronically commutated motor. A tachometer pulse signal generator generates a signal representative of the rotational speed of the rotatable assembly of the motor and having a duty cycle. The control circuit includes first and second motor voltage inhibiting circuits. The first inhibiting circuit inhibits application of the motor voltage to the winding stages of the motor in response to the tachometer pulse signal when the motor speed is below the preset minimum speed. The second inhibiting circuit inhibits application of the motor voltage to the winding stages in response to the tachometer pulse signal when the duty cycle of the tachometer pulse signal is outside a preselected acceptable range. Application of the motor voltage to the winding stages is inhibited when the motor is stalling as indicated by the motor speed being below the preset minimum speed or as indicated by the duty cycle of the tachometer pulse signal being outside the preselected acceptable range.

28 Claims, 3 Drawing Sheets

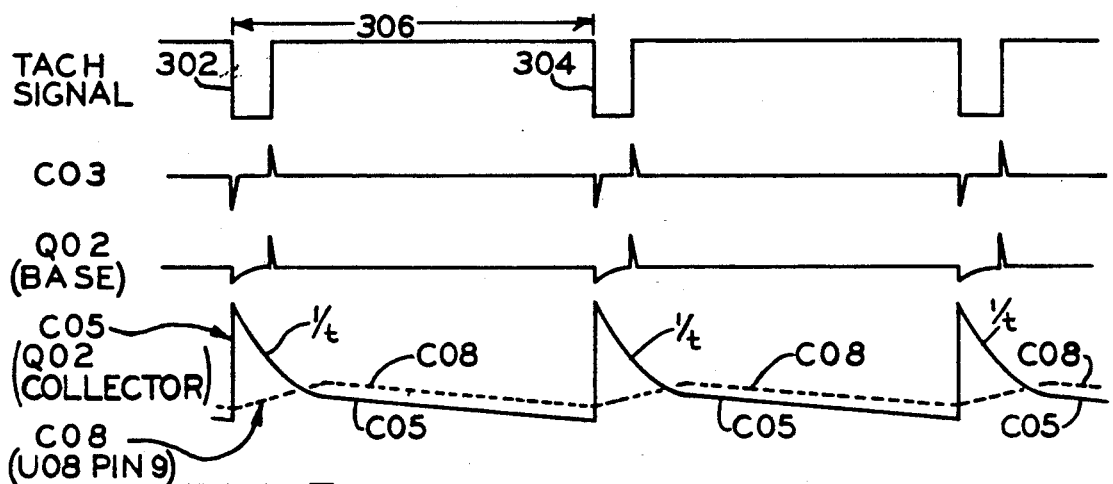
FIG_3
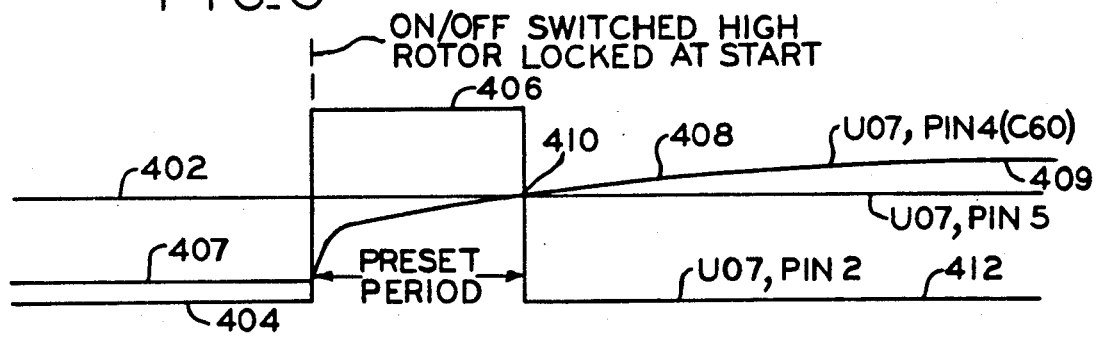
FIG_4
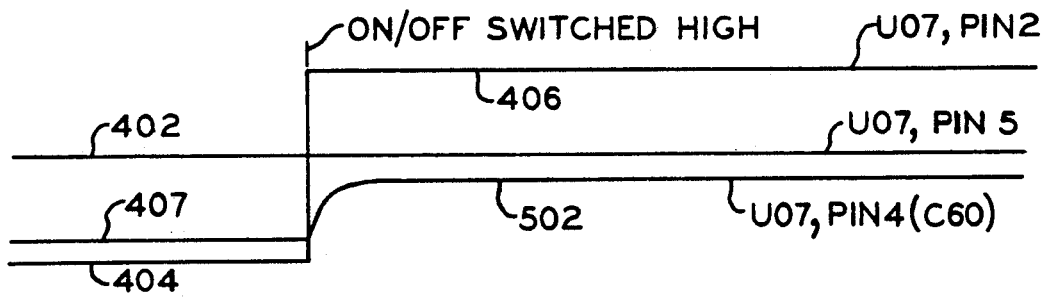
FIG_5
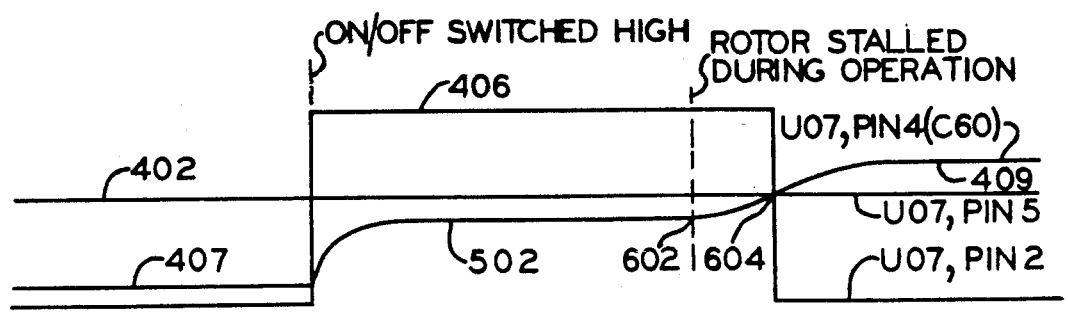
FIG_6

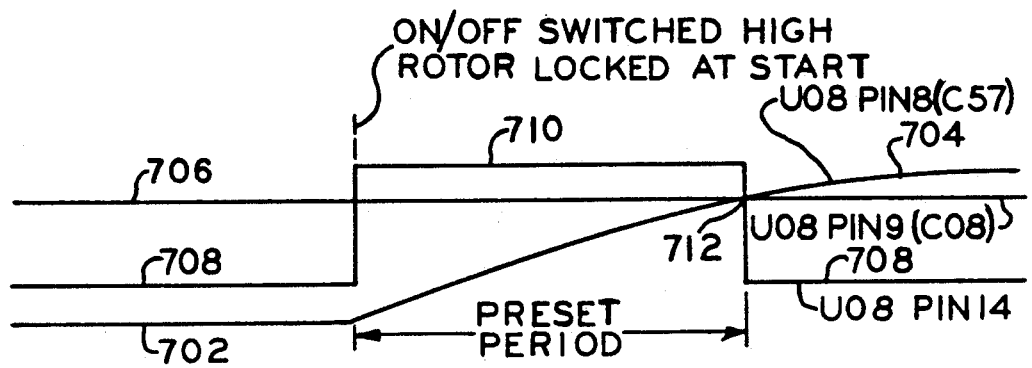
FIG_7
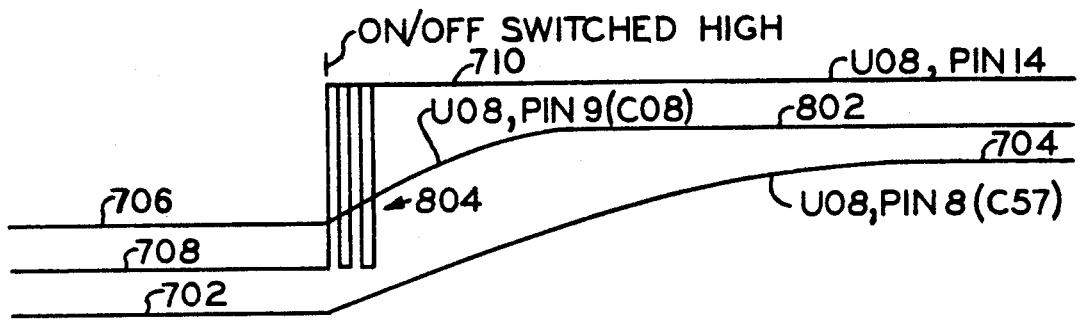
FIG_8
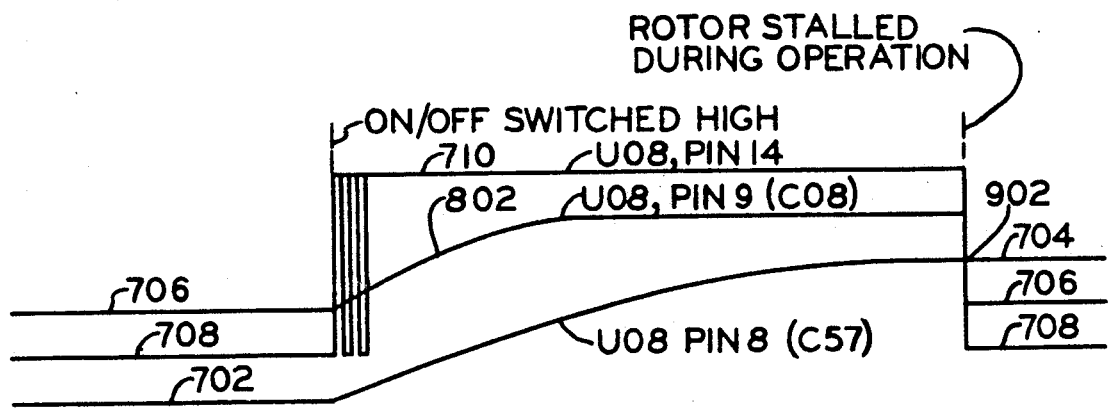
FIG_9

STALL PROTECTION CIRCUIT FOR AN ELECTRONICALLY COMMUTATED MOTOR

BACKGROUND OF THE INVENTION

The invention generally relates to stall protection circuits for motors and, in particular, a stall protection circuit for an electronically commutated motor wherein the circuit is part of the drive control for the electronically commutated motor.

Some electronically commutated applications experience excessive temperature rise at even normal operating current levels after operation under stall conditions. This is due to the inability of the motor to dissipate heat built up during the stall condition. In a stall condition, the lack of air circulation inhibits heat dissipation. Hermetically sealed motors are particularly sensitive to temperature rises at or after stall conditions. Some hermetically sealed motors under normal operation take full advantage of the cooling capability of refrigerants being pumped through a system with which the motor is associated. These motors are particularly sensitive to temperature rise at stall when refrigerants are not being pumped and the cooling capability has been lost.

The requirement for stall protection has typically been met by monitoring the temperature and current of the motor. In particular, temperature sensors are physically attached to the stator windings and/or current sensitive sensors are placed electrically in series with the windings. In certain electronically commutated motor applications, the use of such sensors is complicated by two factors. First of all, as the electronically commutated motor drive provides a three-phase current source to the motor, the current sensors have to be three-phase protectors. Second of all, as the electronically commutated motor drive regulates the current, the temperature sensors must operate solely on winding temperature rise, which slows their operation. In addition, this slower operation causes a longer protection cycle requiring a significantly longer test period to demonstrate the multicycle capability of the device in a particular application.

In many electronically commutated motor systems the motor drives a compressor drive and provides a speed reference signal to a system controller. In these systems, the combination of the electronically commutated motor and the system controller can be configured as a protection circuit for stall conditions. However, the extra requirements placed on the system controller can be very burdensome. It would be desirable to provide a stall protection circuit which minimizes the above disadvantages and provides responsive protection to stalling.

SUMMARY OF THE INVENTION

It is an object of this invention to provide a stall protection circuit that permits a full torque be delivered at the start of an interval of time adequate to achieve some minimum operational speed of the motor under normal conditions.

It is another object of this invention to provide a stall protection circuit which, in the event of a stall condition, reduces the motor current below some maximum amount before winding temperatures exceed the insulation breakdown temperature ratings of the winding.

It is another object of this invention to provide a stall protection circuit which is externally resettable after it has functioned to protect the motor in a stall condition.

It is still another object of this invention to provide a stall protection circuit which fulfills a single mode failure safe criterion to the maximum degree to readily facilitate qualification.

It is an object of this invention to provide a circuit integral with an electronically commutated motor drive control which can be qualified for safety, such as by Underwriter Laboratories, as a stall protection circuit.

In one embodiment, the invention comprises a control circuit for a system including an electronically commutated motor. The motor has a stationary assembly with a plurality of winding stages for carrying a motor current in response to application of a voltage. The motor also has a rotatable assembly associated with the stationary assembly in selective magnetic coupling relation therewith for rotation at a motor speed in response to a magnetic field generated by the winding stages. A commutating circuit for the motor is responsive to a control signal for applying the voltage to one or more of the winding stages at a time to commutate the winding stages in a preselected sequence to rotate the rotatable assembly. Tachometer pulse signal generating means generates a signal representative of rotation of the rotatable assembly. The control circuit comprises first and second means. The first means inhibits application of the motor voltage to the winding stages in response to the tachometer pulse signal when the motor speed is below a preset minimum speed thereby preventing the application of the motor voltage when the motor speed is below the preset minimum speed. The second means inhibits application of the motor voltage to the winding stages in response to the tachometer pulse signal when the duty cycle of the tachometer pulse signal is outside a preselected acceptable range thereby preventing application of the motor voltage when the duty cycle of the tachometer pulse signal is outside the preselected acceptable range. Application of the motor voltage to the winding stages is inhibited when the motor is stalled as indicated by the motor speed being below the preset minimum speed or as indicated by the duty cycle of the tachometer pulse signal being outside the preselected acceptable range.

Other objects and features will be in part apparent and in part pointed out hereinafter.

BRIEF DESCRIPTION OF THE DRAWINGS

FIG. 3 is a timing diagram, relating to the ac coupled motor voltage inhibiting circuit, illustrating the waveforms of the tachometer pulse signal, the charge on the ac coupling capacitor C03, the signal at the base of the control transistor of the 1/time circuit, the charge on capacitor C05 applied to the collector of the control transistor, and the charge developed on the motor speed signal capacitor C08 and applied to pin 9 of comparator U08.

FIG. 4 is a waveform diagram, relating to the dc coupled circuit, illustrating the waveforms of the charge on the duty cycle capacitor C60 applied to pin 4 of comparator U07, the charge on the minimum duty cycle capacitor C61 applied to pin 5 of comparator U07 and the output level of pin 2 of comparator U07 when the on/off signal is switched high and the rotor is stalled at start.

Figure 1:
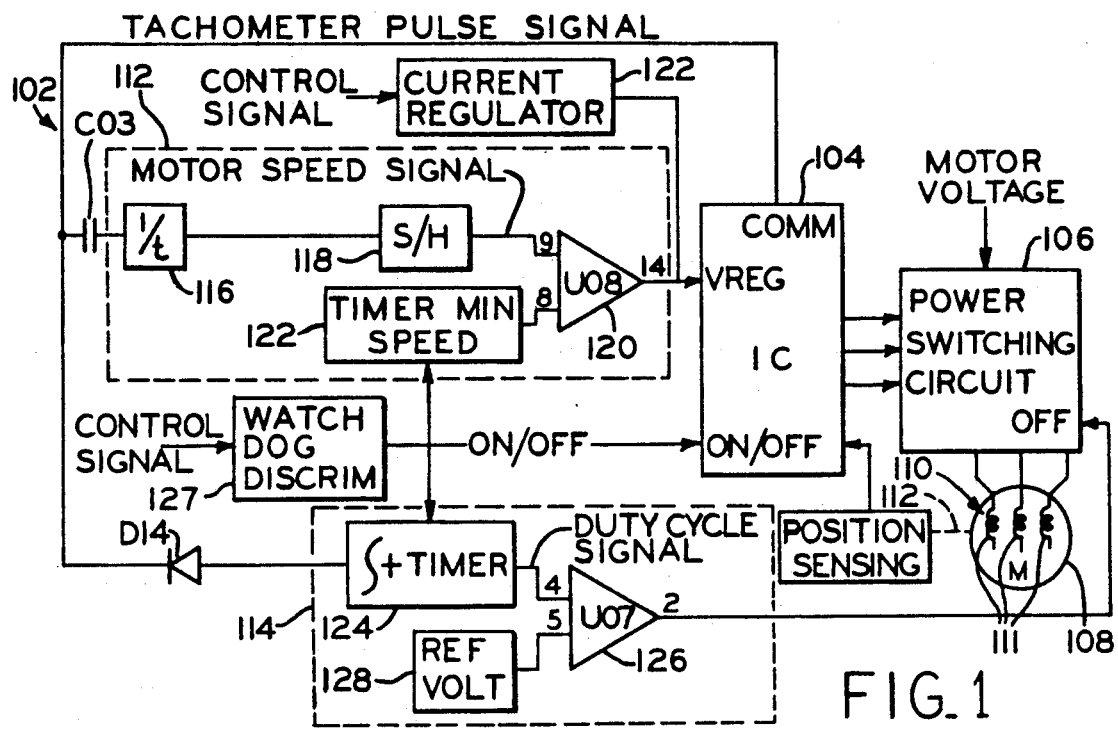
FIG. 1 is a block diagram of one preferred embodiment of a stall protection circuit according to the invention in combination with an integrated circuit, power switching circuit and motor.

FIG. 5 is a waveform diagram, relating to the dc coupled circuit, illustrating the waveforms of the charge on the duty cycle capacitor C60 applied to pin 4 of comparator U07, the charge on the minimum duty cycle capacitor C61 applied to pin 5 of comparator U07 and the output level on pin 2 of comparator U07 when the on/off level is switched high, and normal operation occurs.

FIG. 6 is a waveform diagram, relating to the dc coupled circuit, illustrating the waveforms of the charge on the duty cycle capacitor C60 applied to pin 4 of comparator U07, the charge on the minimum duty cycle capacitor C61 applied to pin 5 of comparator U07 and the output level on pin 2 of comparator U07 when the rotor stalls during operation after normal starting and running.

FIG. 7 is a waveform diagram relating to the ac coupled circuit, illustrating the waveforms of the charge on the minimum motor speed capacitor C57 applied to pin 8 of comparator U08, and the output level on pin 14 of comparator U08 when the on/off signal is switched high and the rotor is locked at start.

FIG. 8 is a waveform diagram, relating to the ac coupled circuit, illustrating the waveforms of the charge on the minimum motor speed capacitor C57 applied to pin 8 of comparator U08, the charge on the motor speed signal capacitor C08 applied to pin 9 of comparator U08 and the output level on pin 14 of comparator U08 when the on/off signal is switched high, and normal operation occurs.

FIG. 9 is a waveform diagram, relating to the ac coupled circuit, illustrating the waveforms of the charge on the minimum motor speed capacitor C57 applied to pin 8 of comparator U08, the charge on the motor speed signal capacitor C08 applied to pin 9 of comparator U08 and the output level on pin 14 of comparator U08 when the rotor stalls after normal starting and running.

Corresponding reference characters indicate corresponding parts throughout the several views of the drawings.

DETAILED DESCRIPTION OF THE PREFERRED EMBODIMENTS

Referring to FIG. 1, a control circuit generally referred to by reference character 102 is responsive to a control signal provided by a system controller (not shown). Circuit 102 provides signals to integrated circuit (IC) 104 for controlling a power switching circuit 106 to drive a motor 108. Coassigned U.S. Pat. No. 4,500,821 invented by Bitting et al., entitled Speed or Torque Control Circuit for an Electronically Commutated Motor and Method of Controlling the Torque or Speed of an Electronically Commutated Motor, is incorporated herein by reference as an example of IC 104 and power switching circuit 106 as is well known in the prior art. In general, the purpose of control circuit 102 is to receive the control signal from the system controller and convert it into a signal which can be provided to control IC 104. The above-noted patent illustrates one example of such a control circuit. As another example, motor 108 may be used to drive a refrigeration compressor (not shown) in which the refrigeration system controller generates the control signal depending on the particular cycle in which the refrigeration system is operating.

Motor 108 is an electronically commutated motor having a stationary assembly 110 with a plurality of winding stages 111 for carrying motor current in response to application of a motor voltage supplied via the power switching circuit 106. Motor 108 includes a rotatable assembly 112 magnetically associated with the stationary assembly in selective magnetic coupling relation therewith for rotation at a motor speed in response to a magnetic field generated by the winding stages. Control circuit 102 is for use with a commutating circuit for motor 108 such as IC 104 and is responsive to the control signal for applying the motor voltage to one or more of the winding stages at a time to commutate the winding stages in a preselected sequence to rotate the rotatable assembly 112. The control circuit 102 is responsive to a tachometer pulse signal generator such as IC 104 generating a signal representative of the rotational speed of the rotatable assembly 110. For example, the tachometer pulse signal may be a signal generated in response to position sensing such as back emf sensing performed by IC 104.

Reference character 112 refers to a first motor voltage inhibiting circuit for inhibiting application of the motor voltage to the winding stages in the event that the motor speed is below a preset minimum motor speed range, i.e. an unacceptable motor speed indicative of a motor stall. Reference character 114 refers to a second motor voltage inhibiting circuit for inhibiting application of the motor voltage to the winding stages in the event that a duty cycle of the tachometer pulse signal, i.e., the active portion of the tachometer pulse signal, is outside a preselected duty cycle range, i.e. an unacceptable duty cycle indicative of a motor stall. Preferably, the first motor voltage inhibiting circuit is ac coupled to the tachometer pulse signal via a capacitor C03 and the second motor voltage inhibiting circuit 112 is dc coupled to the tachometer pulse signal, such as by a diode 41. Therefore, the control circuit 102 according to the invention includes two separate circuits which can be used separately or in combination. The difference between these circuits is the mode in which they are coupled to the tachometer pulse signal and, as will be described below, the type of monitoring of the tachometer of the pulse signal that the circuits perform. In general, the first inhibiting circuit 112 uses a capacitor coupled (ac coupled) tachometer monitoring circuit which assures a safe shut down in the event of a continuous high failure mode in the tachometer pulse signal generated by IC 104. The second inhibiting circuit 114 is a direct coupled (dc coupled) tachometer pulse signal monitoring circuit which assures safe operation in the event of a fast running start oscillator used by IC 104 to generate the tachometer pulse signal.

The first inhibiting circuit 112 includes an inverse time circuit (1/t) 116 for generating a signal from the ac coupled tachometer pulse signal which represents time (t) between pulses of the tachometer pulse signal. This signal is provided to a sample and hold (S/H) circuit 118 to generate a signal motor speed corresponding to the motor speed. This motor speed signal is applied to the noninverting input pin 9 of a comparator 120. The inverting input pin 8 of comparator 120 is supplied with a reference voltage which, except during start up as will be described below, represents the minimum acceptable motor speed. As long as the voltage on pin 9 representing the motor speed signal is greater than or equal to the voltage on pin 8 representing the minimum motor speed, the output pin 14 of comparator 120 remains high. This permits current regulator to process the control signal and supply a current regulation signal input to the VREG input of IC 120 which is responsive to the control signal. In the event that the voltage of the motor speed signal on pin 9 falls below the minimum motor speed voltage on pin 8, thereby indicating that the motor speed has dropped below the acceptable level, the output of comparator 120 goes low to ground the VREG input of IC 104 and inhibit the control regulation signal to prevent application of the motor voltage to the winding stages.

The second motor voltage inhibiting circuit 114 includes an integrator and timer 124 which is dc coupled to the tachometer pulse signal and generates a duty cycle signal corresponding to the duty of the tachometer pulse signal. In general, the integrator and timer 124 integrate the tachometer pulse signal over the period of time between pulses in order to generate a signal representative of the duty cycle of the tachometer pulse signal. As the active state of the commutate pulse is low, reduced duty cycle operation which would accompany low speed results in an increase in voltage. This duty cycle signal is provided to inverting input pin 4 of comparator 126. Noninverting input pin 5 of comparator 126 is provided with a reference voltage 128 representing the minimum acceptable duty cycle. As long as the duty cycle signal on pin 4 indicates that the duty cycle of the motor 108 is within a preset range, i.e., above the duty cycle represented by the reference voltage 128 on pin 5, power switching circuit 106 is operational to provide a motor voltage for application to the winding stages of motor 108. In the event that the voltage of the duty cycle signal exceeds the reference voltage 128, thereby indicating that the duty cycle is below the minimum acceptable duty cycle, output pin 2 of comparator 126 goes low to turn off the power switching circuit 106 and discontinue application of the motor voltage to motor 108. In summary, the first motor voltage inhibiting circuit 112 assures a safe shutdown in the event of a continuous failure at the level corresponding to the active state in the commutate signal derived from the IC 104. On the other hand, the second motor voltage inhibiting circuit 114 assures shut down in the event of a fast running start oscillator in the control IC 104.

In addition, control circuit 102 may include a watchdog discriminator 127 for recognizing the control signal and activating the minimum speed generator 122 and the integrator and timer 124. If the watchdog discriminator 127 is unable to detect a control signal, both the minimum speed signal generator 122 and the integrator and timer 124 are not activated and IC 104 is turned off via its on/off input to inhibit operation of motor 108.

Figure 2:
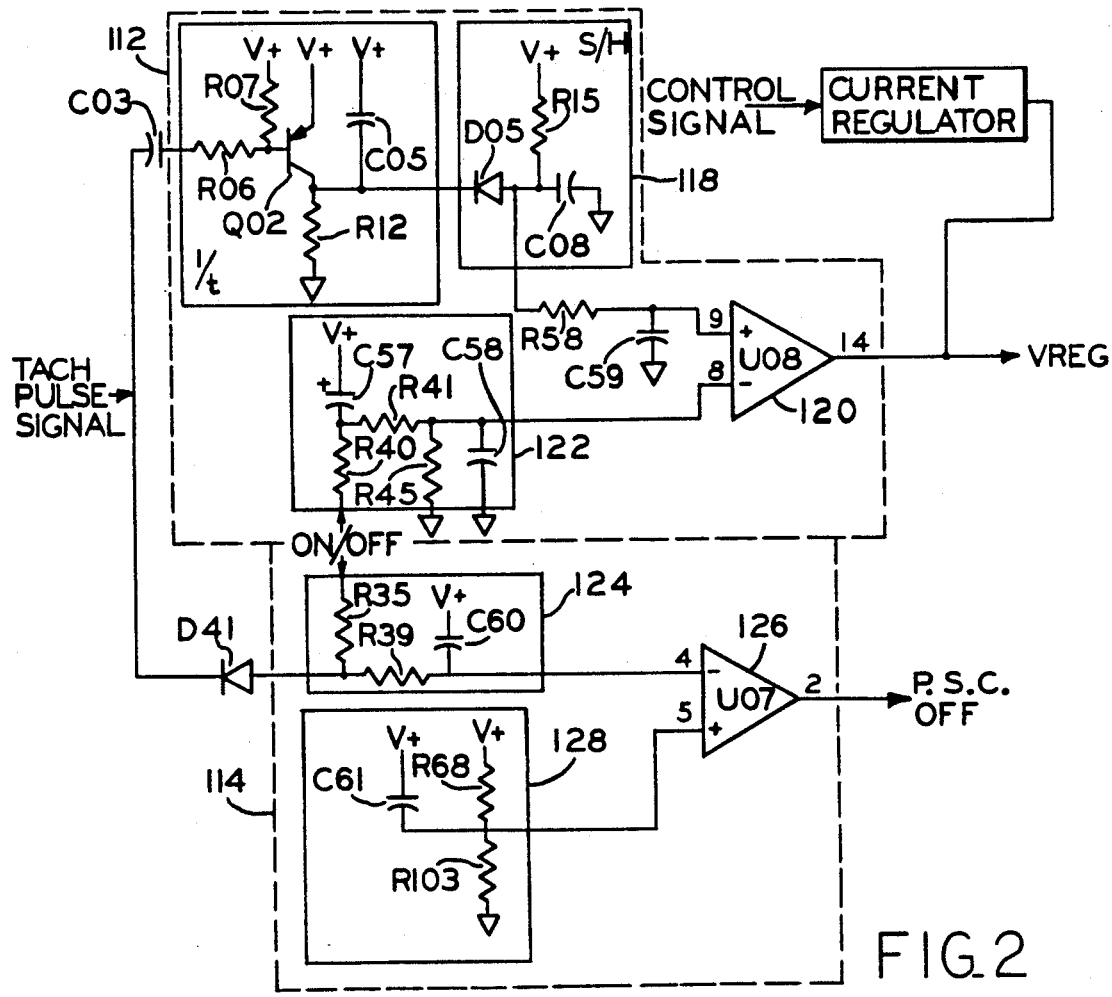
FIG. 2 is a schematic diagram of one preferred embodiment of the stall protection circuit illustrated in FIG. 1.

Referring to FIGS. 2 and 3, the components and operation of inhibiting circuits 112 and 114 will be described in greater detail. Capacitor C03 provides the referenced ac coupling of the tachometer pulse signal to the first inhibiting circuit 112. At each falling edge 302 of the tachometer pulse signal, capacitor C05 is charged by transistor Q02. Thereafter, it discharges through resistor R12 until the next falling edge 304. During this discharging interval 306 between falling edges, capacitor C08 has been charging through resistor R15. However, the time constant of resistor R15/capacitor C08, i.e., R15 times C08 is ten times the time constant of resistor R12 and capacitor C05, i.e., R12 times C05. Furthermore, the resistance of R12 is one-tenth of resistor R15. Ultimately, the charge on capacitor C08 is determined by the final value to which capacitor C05 charges just before it is discharged by the next falling edge. The voltage across capacitor C05 decreases as speed (the commutate frequency) increases. The combination of these actions is that the exponential charging of capacitor C05 approximates a 1/time function, and the clamping of the voltage on capacitor C08 approximates a sample and hold circuit therefor. This produces a tachometer monitoring circuit with a relatively rapid response time and significant ripple voltage. Resistor R58 and capacitor C59 may be added to minimize the ripple voltage.

The minimum speed generator 122 initially functions as a timer. Before the control signal is provided, a timer capacitor C57 has been previously charged through a resistor 40 to full logic supply voltage V+. This assures more consistent timing by the low leakage electrolytic capacitor C57 at start. When the on/off input goes high indicating that the watch dog discriminator 128 has detected a control signal, capacitor C57 begins discharging through resistors R41 and R45. As a result, the voltage that is applied to inverting input pin 8 of comparator 120 begins to increase. The action of the comparator 120 is to shut off the delivery of current to the motor 108 should the voltage at the inverting input pin 8 from the timer and minimum speed control 122 exceed the voltage from the sample and hold circuit 118 on the noninverting input pin 9. Therefore, resistor divider network of R40, R41 and R45 combine to set a minimum speed of operation. The resistor R41 represents the maximum source resistance to capacitor C57 while scaling the required voltage to the comparator 120 and minimizing the individual resistance values in the network. Capacitor C58 filters noise that would otherwise appear at pin 8 of the comparator 120.

The bias above zero on capacitor C59 combines with the motor starting circuit of IC 104 to force an apparent minimum speed, such as 85 rpm, on the tachometer pulse signal. As a result, the control circuit 102 provides sufficient initial allowance for low speed operation during the start sequence of motor 108. After the capacitor C57 reaches its final charged value, the speed of the motor 108 must be maintained above the minimum speed of operation for current to the motor 108 to be maintained and to prevent an off signal being provided to the power switching circuit 106.

Preferably, IC 104 provides a tachometer pulse signal at its COMM (commutate) output that includes a start function which forces commutation at a preset minimum frequency to drive the rotor out of a zero torque alignment with the stator poles at the initialization of operation. This start function can lead to a possible failure that would be derived from a very high frequency tachometer pulse rate. Such a failure would not cause the ac coupled first inhibiting circuit 112 to inhibit motor operation. For example, suppose that a resistor/capacitor reference for the IC 104 start function is reduced by component failure to the point that the start oscillator within IC 104 produces a commutate frequency great enough to exceed the minimum threshold for speed in the ac coupled stall protection circuit. In such an event, current to the motor would be maintained even if the rotor were stalled.

In contrast, the dc coupled circuit 114 does not respond in the same manner as the ac coupled circuit 112. The dc coupled inhibiting circuit 114 uses the fixed width of the tachometer pulse supplied by the COMM output of IC 104 to develop a duty cycle measuring circuit. The fixed pulse width results in a measurement that is linearly proportional to the frequency of the pulses. Resistors R35 and R39 along with capacitor C60 constitute the integrator and timer 124. This generates the duty cycle signal provided to the inverting input pin 4 of comparator 126. Essentially, the rate at which capacitor C60 is discharged by the high on/off signal produces the timer function. The action of diode 41 coupled to the inverted fixed pulse width tachometer pulse signal and the averaging circuit of resistor R39 and C60 produce the integration function. As in the ac coupled stall protection circuit, the timer capacitor C60 is charged to full logic supply voltage at the initiation of the start sequence. Alternatively, in both the ac coupled and dc coupled circuits, the timer capacitor C57 and C60 could be connected to logic common and begin the timing function from a discharge state without departing from the basic concepts according to the invention.

When the watchdog discriminator 127 detects a control signal, the on/off signal it provides goes high indicating an "on" condition. As a result, the voltage that is supplied to the inverting input pin 4 of comparator 126 begins to increase as the voltage at capacitor C60 increases. However, the tachometer pulses at diode 41 modulate the voltage supplied to the averaging circuit of resistor R39 and capacitor 60 so that the final voltage developed at capacitor C60 is limited by the tachometer pulse duty cycle. As the pulse width is held constant for normal operation, the voltage at capacitor C60 is limited by the pulse signal frequency. The higher the tachometer pulse signal frequency as detected by diode D41, the lower the final voltage developed at capacitor C60. The action of the comparator 126 is to shut off the delivery of the current to the motor 108 should the voltage at the inverting input pin 4 from the timer circuit 124 exceed the voltage from the fixed reference voltage 128 at the noninverting input pin 5. The resistor divider network of resistors R68 and R103 combine to define a voltage representative of a minimum speed of operation after the start time out. The start time out is the period during which capacitor C60 is charging from full logic V+ to its maximum as limited by the tachometer pulses. Capacitor C61 filters noise that would otherwise appear at the noninverting input pin 5 of comparator 126.

As noted above, the ac coupled stall protection circuit 112 would not inhibit motor operation if the resistor/capacitor (R/C) reference for the start function for IC 104 is reduced by component failure to the point that the start oscillator in IC 104 produces a commutate frequency great enough to exceed the minimum threshold for speed in the ac coupled stall protection circuit 112. In contrast, the dc coupled circuit 114 would not respond in the same manner. The same R/C reference for the start oscillator sets the pulse width for the commutate pulse. The commutate pulse width is one period of the start oscillator and the start commutate period is a preset number of oscillation periods, i.e., 193 oscillator periods. The start function then produces the same output to the dc coupled stall protection circuit 114 regardless of start oscillator speeds because of the duty cycle measurement feature of the dc coupled circuit.

It is also important to note that the ac coupled circuit 112 and the dc coupled circuit 114 insert their respective current shutdown signals into different sites of the motor control. In particular, the ac coupled circuit 112 inhibits the VREG input of IC 104 to inhibit application of the motor voltage to motor 108 by shutting down commutation. On the other hand, the dc coupled stall protection circuit 112 actuates stall protection by providing an off indication to the power switching circuit 106 to prevent the application of the motor voltage to the winding stages of the motor 108. This further enhances the single mode fail safe features of the combined control circuit 102.

FIGS. 4-6 illustrate the operation of the dc coupled circuit 114. In FIG. 4, line 402 represents the reference voltage being applied to the noninverting input pin 5 of comparator 126 (U07) as generated by the reference voltage source 128. Line 404 represents the low level at output pin 2 of comparator 126 (U07) through the action of other control circuitry (not shown) before the control signal is provided and before the watch dog discriminator 128 provides a high signal indicating an "on" condition. When the on/off signal is switched high by discriminator 128, the voltage at output pin 2 is allowed to go high as illustrated by line 406. If the rotor is locked at start, the voltage on inverting input pin 4 as illustrated by line 408 steadily increases as capacitor C60 charges from bias level 407 until it reaches its maximum level 409. At point 410, when the voltage level 408 on pin 4 exceeds the voltage level 402 on pin 5, pin 2 drops low level 412 to discontinue application of motor voltage to the motor windings.

Circuits 112 and 114 have been described for use in combination with a tachometer pulse signal having negative commutation pulses. It will be apparent to those skilled in the art that other, similarly designed circuitry may be employed for positive commutation pulses. Alternatively, other components may be employed to follow the tachometer signal such as a comparator or operational amplifier. Alternatively, other components may be used to provide coupling such as a base-collector as a decoupler.

FIG. 5 illustrates the waveforms of the dc coupled circuit 114 during normal operation. When the on/off signal is switched high, the voltage at output pin 2 is allowed to go from the low level 404 to the high level 406. The voltage on pin 4, which is the voltage level of capacitor C60, increases from bias level 407 to a steady state 502. This steady state 502 is below level 402 because of the modulation of the tachometer pulses. As long as the duty cycle of the tachometer pulse signal as represented by line 402 is above the preset minimum duty cycle as represented by line 502, output pin 2 remains high. This is because the voltage level 502 being applied to inverting input pin 4 of comparator 126 remains below the voltage level 402 of noninverting pin 5.

Comparing FIGS. 4 and 5, it can be appreciated that dc coupled circuit 114 inhibits application of the motor voltage only after a preset period as illustrated in FIG. 4. This period begins when the on/off signal is switched high and ends at point 410 when the charge on capacitor C60, representing the duty cycle of the tachometer pulse signal, equals or exceeds the reference voltage 128 representing the maximum acceptable duty cycle. This preset period (or delay in the activation of the inhibit function) permits the motor to employ any type of start-up procedure, such as a soft start as noted in coassigned U.S. Pat. No. 4,763,347, incorporated herein by reference.

FIG. 6 illustrates the waveforms of the dc coupled circuit 114 in the event that the rotor stalls during normal operation. The lack of tachometer pulse signals permits the voltage applied to pin 4 to begin to increase from bias level 407 to the steady state level 502. At point 602, it begins to increase again to a fully charged level 503 for capacitor C60 and then maintains that level. At point 604, when the increasing voltage level on pin 4, becomes greater than the level of voltage on pin 5, the output of comparator 126 drops from the high level 406 to the low level 404.

FIGS. 7-9 illustrate operation of the ac coupled circuit 112. FIG. 7 illustrates operation when the rotor is locked at start. When the on/off signal is switched high, the voltage being applied to inverting input pin 8 begins to steadily increase from a bias level 702 to a steady state level 704 as capacitor C57 discharges. Because the rotor is locked, the bias voltage 706 being applied to noninverting input pin 9 as determined by the charge on capacitor C08 does not substantially change (other than the ripple as illustrated in FIG. 3). When the on/off signal is switched high, output pin 14 is allowed to go from a low level 708 to a high level 710 to permit current flow by action of the IC and the current regulate circuit. However, at point 712 the voltage on pin 8 becomes equal to or greater than the voltage on pin 9 so that pin 14 drops to low level 708 to inhibit any further current delivery to the winding stages by action of the IC.

FIG. 8 illustrates the operation of the ac coupled circuit 112 during normal conditions. When the on/off signal is switched high, the voltage on pin 8 begins to steadily increase from bias level 702 to steady state level 704 as capacitor C57 discharges. When the on/off signal is switched high, the voltage on capacitor C08 and applied to pin 9 also moves from bias level 706 to a higher level 802 because the tachometer pulses reduce the discharge time of capacitor C05 thereby increasing the charge on capacitor C08. As a result, the voltage level on pin 9 stays above the voltage level on pin 8 so that output pin 14 goes from low level 708 to high level 710 and remains high to permit the action of the IC to commutate the winding stages. Immediately after the on/off signal is switched high, the voltage on pin 8 tends to vary between low level 708 and high level 710 because the voltage on pin 8 is being controlled by the current regulator 122 during this period. This is generally illustrated in FIG. 8 by the area referred to by reference character 804.

Comparing FIGS. 7 and 8, it can be appreciated that ac coupling circuit 112 inhibits application of the motor voltage only after a preset period as illustrated in FIG. 7. This period begins when the on/off signal is switched high and ends at point 712 when the charge on capacitor C57, representing the minimum acceptable speed, equals or exceeds the charge on capacitor C08 representing the motor speed. This preset period (or delay in the activation of the inhibit function) permits the motor to employ any type of start-up procedure, such as a soft start.

FIG. 9 illustrates the operation of the ac coupled circuit 112 when the rotor stalls after a period of normal running. As in FIG. 8, when the on/off signal is switched high, both pins 8 and 9 increase in voltage. The voltage level on pin 9 goes from bias level 708 to steady state level 802. The voltage level on pin 8 remains below the level on pin 9 and goes from bias level 702 to steady state level 704. When the rotor stalls, the voltage on capacitor C08 and being applied to pin 9 immediately drops from level 802 to level 708 because the lack of tachometer pulses increases the discharge time of capacitor C05 which, in turn, reduces the charge on capacitor C08. Level 708 is below the level of pin 8 at point 902. As a result, the output of pin 14 drops to low level 706 to inhibit application of the motor voltage to the winding stages.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A control circuit for a system including an electronically commutated motor having a stationary assembly with a plurality of winding stages for carrying a motor current in response to application of a voltage and having a rotatable assembly associated with the stationary assembly in selective magnetic coupling relation therewith for rotation at a motor speed in response to a magnetic field generated by the winding stages, a commutating circuit for the motor responsive to a control signal for applying the voltage to one or more of the winding stages at a time to commutate the winding stages in a preselected sequence to rotate the rotatable assembly, and tachometer pulse signal generating means for generating a pulsed signal representative of the rotational speed of the rotatable assembly and having a duty cycle, said control circuit comprising:

first means for inhibiting application of the motor voltage to the winding stages in response to the tachometer pulse signal when the motor speed is below a preset minimum speed; and second means for inhibiting application of the motor voltage to the winding stages in response to the tachometer pulse signal when the duty cycle of the tachometer pulse signal is outside a preselected acceptable range whereby application of the motor voltage to the winding stages is inhibited when the motor is stalling as indicated by the motor speed being below the preset minimum speed or as indicated by the duty cycle of the tachometer pulse signal being outside the preselected acceptable range.

2. The control circuit of claim 1 further comprising means for ac coupling the tachometer pulse signal to the first inhibiting means and means for dc coupling the tachometer pulse signal to the second inhibiting means.

3. The control circuit of claim 2 wherein the ac coupling means comprises a capacitor through which the tachometer pulse signal is supplied to the first inhibiting means and the dc coupling means comprises a diode through which the tachometer pulse signal is supplied to the second inhibiting means.

4. The control circuit of claim 1 wherein the first inhibiting means comprises:

means, responsive to the tachometer pulse signal, for generating a motor speed signal having a magnitude representative of the motor speed;

means for generating a minimum pulse rate signal having a magnitude representative of a minimum pulse rate, said minimum pulse rate corresponding to the preset minimum speed;

means for comparing the magnitude of the motor speed signal to the magnitude of the minimum pulse rate signal; and means responsive to the comparing means, for inhibiting application of the motor voltage to the winding stages when the magnitude of the motor speed signal is less than the magnitude of the minimum pulse rate signal.

5. The control circuit of claim 4 wherein the first inhibiting means inhibits application of the motor voltage to the winding stages only after a preset period of time after the control signal is provided.

6. The control circuit of claim 5 wherein the minimum pulse rate signal generating means comprises means for generating as the minimum pulse rate signal a signal having a magnitude which increases to a substantially constant level.

7. The control circuit of claim 6 wherein the duty cycle signal generating means includes means for generating a duty cycle signal having a magnitude greater than the magnitude of the minimum duty cycle signal during the preset period.

8. The control circuit of claim 4 wherein the motor speed signal generating means comprises means for generating a frequency signal directly proportional to the pulse rate of the tachometer pulse signal and means for sampling and holding the frequency signal to generate the motor speed signal.

9. The control circuit of claim 8 wherein the tachometer pulse signal comprises a series of negative going pulses and wherein the frequency signal generating means comprises a capacitor charged in response to each negative going pulse and discharged at a rate of 1/t where t is the period of time between pulses of the tachometer pulse signal.

10. The control circuit of claim 9 wherein the minimum pulse rate signal generating means comprises a second capacitor adapted to begin charging in response to the control signal.

11. The control circuit of claim 10 wherein the charge on the second capacitor increases at a rate which is less than the rate of increase of the motor speed during a preset period of time after the control signal is provided.

12. The control circuit of claim 1 wherein the tachometer pulse signal comprises a series of negative going pulses and wherein the second inhibiting means comprises:
  means, responsive to the tachometer pulse signal, for generating a duty cycle signal having a magnitude representative of the duty cycle of the tachometer pulse signal;
  means for generating a minimum duty cycle signal having a magnitude representative of the preselected acceptable range;
  means for comparing the magnitude of the duty cycle signal to the magnitude of the minimum duty cycle signal; and
  means, responsive to the comparing means, for inhibiting application of the motor voltage to the winding stages when the magnitude of the duty cycle signal is less than the magnitude of the minimum duty cycle signal.

13. The control circuit of claim 12 wherein the second inhibiting means inhibits application of the motor voltage to the winding stages only following a preset period of time after the control signal is provided.

14. The control circuit of claim 13 wherein the duty cycle signal generating means comprises an integrator for integrating the tachometer pulse signal and generating a signal corresponding thereto.

15. The control circuit of claim 14 wherein the duty cycle signal generating means includes means for generating a duty cycle signal having a magnitude greater than the magnitude of the minimum duty cycle signal during the preset period.

16. The control circuit of claim 1 wherein the first inhibiting means inhibits application of the motor voltage only following a preset period of time after the control signal is provided.

17. The control circuit of claim 1 wherein the second inhibiting means inhibits application of the motor voltage only after a preset period of time after the control signal is provided.

18. The control circuit of claim 1 further comprising means for detecting the control signal and wherein the first and second inhibiting means are responsive to the detecting means.

19. The control circuit of claim 1 wherein the commutating circuits controls power switching means for selectively applying the voltage to the winding stages, wherein said first means inhibits operation of the commutating circuit and wherein the second means inhibits operation of the power switching means.

20. A control circuit for a system including an electronically commutated motor having a stationary assembly with a plurality of winding stages for carrying a motor current in response to application of a voltage and having a rotatable assembly associated with the stationary assembly in selective magnetic coupling relation therewith for rotation at a motor speed in response to a magnetic field generated by the winding stages, and a commutating circuit for the motor responsive to a control signal for applying the voltage to one or more of the winding stages at a time to commutate the winding stages in a preselected sequence to rotate the rotatable assembly, said control circuit comprising:
  means for generating a pulsed motor speed signal having a pulse rate representative of the motor speed;
  means for defining a minimum motor speed;
  means for comparing the motor speed represented by the pulsed motor speed signal to the minimum motor speed; and
  means, responsive to the comparing means, for inhibiting application of the motor voltage to the winding stages when the motor speed is below the minimum motor speed whereby application of the motor voltage to the winding stages is inhibited when the motor is stalling as indicated by motor speed being below the minimum motor speed.

21. The control circuit of claim 20 wherein the defining means comprises means for generating a minimum pulse rate signal having a magnitude representative of a minimum pulse rate and wherein the comparing means compares the magnitude of the motor speed signal to the magnitude of the minimum pulse rate signal and indicates when the magnitude of the motor speed signal is less than the magnitude of the minimum pulse rate signal.

22. The control circuit of claim 20 further comprising means for ac coupling the tachometer pulse signal to the comparing means.

23. The control circuit of claim 20 wherein the inhibiting means inhibits application of the motor voltage to the winding stages only following a preset period of time after the control signal is provided.

24. A control circuit for a system including an electronically commutated motor having a stationary assembly with a plurality of winding stages for carrying a motor current in response to application of a voltage and having a rotatable assembly associated with the stationary assembly in selective magnetic coupling relation therewith for rotation at a motor speed in response to a magnetic field generated by the winding stages, a commutating circuit for the motor responsive to a control signal for applying the voltage to one or more of the winding stages at a time to commutate the winding stages in a preselected sequence to rotate the rotatable assembly, and tachometer pulse signal generating means for generating a signal representative of the rotational speed of the rotatable assembly and having a duty cycle, said control circuit comprising:

means for generating a signal representative of the duty cycle of the tachometer pulse signal;
  means for defining a preselected duty cycle range;
  means for comparing the magnitude of the duty cycle representative signal to the preselected duty cycle range; and
  means, responsive to the comparing means, for inhibiting application of the motor voltage to the winding stages when the magnitude of the duty cycle signal is not within the preselected duty cycle range whereby application of the motor voltage to the winding stages is inhibited when the motor is stalling as indicated by the duty cycle of the tachometer pulse signal being outside the preselected duty cycle range.

25. The control circuit of claim 24 wherein the tachometer pulse signal comprises a series of negative going pulses and wherein the defining means comprises means for generating a minimum duty cycle signal having a magnitude representative of a minimum duty cycle thereby to define the preselected duty cycle range as any duty cycle below the minimum duty cycle and wherein the comparing means compares the magnitude of the duty cycle signal to the magnitude of the minimum duty cycle signal and indicates when the magnitude of the duty cycle signal is less than the magnitude of the minimum duty cycle signal.

26. The control circuit of claim 24 further comprising means for dc coupling the tachometer pulse signal to the comparing means.

27. The control circuit if claim 24 wherein the inhibiting means inhibits application of the motor voltage to the winding stages only following a preset period of time after the control signal is provided.

28. A stall protection control for a system including an electronically commutated motor having a stationary assembly with a plurality of winding stages for carrying a motor current in response to application of a voltage and having a rotatable assembly associated with the stationary assembly in selective magnetic coupling relation therewith for rotation at a motor speed in response to a magnetic field generated by the winding stages, the control comprising:

means for applying the voltage to one or more of the winding stages at a time to commutate the winding stages in a preselected sequence to rotate the rotatable assembly;
  means for generating a tachometer pulse signal representative of the rotational speed of the rotatable assembly and having a duty cycle;
  means for defining a preset minimum speed below which the motor is considered to be in a stall;
  first means, responsive to the tachometer pulse signal, for inhibiting application of the motor voltage to the winding stages when the rotational speed is below the preset minimum speed; and
  means for defining a preselected duty cycle range for the tachometer pulse signal outside of which the motor is considered to be in a stall;
  second means, responsive to the tachometer pulse signal, for inhibiting application of the motor voltage to the winding stages when the duty cycle of the tachometer pulse signal is outside the preselected duty cycle range whereby application of the motor voltage to the winding stages is inhibited when the motor is stalled as indicated by the motor speed being below the preset minimum speed or by the duty cycle of the tachometer pulse signal being outside the preselected acceptable range.

* * * * *